July 14, 1925.
F. B. DEANS
TRUCK
Filed May 29, 1924
1,546,210
2 Sheets-Sheet 1
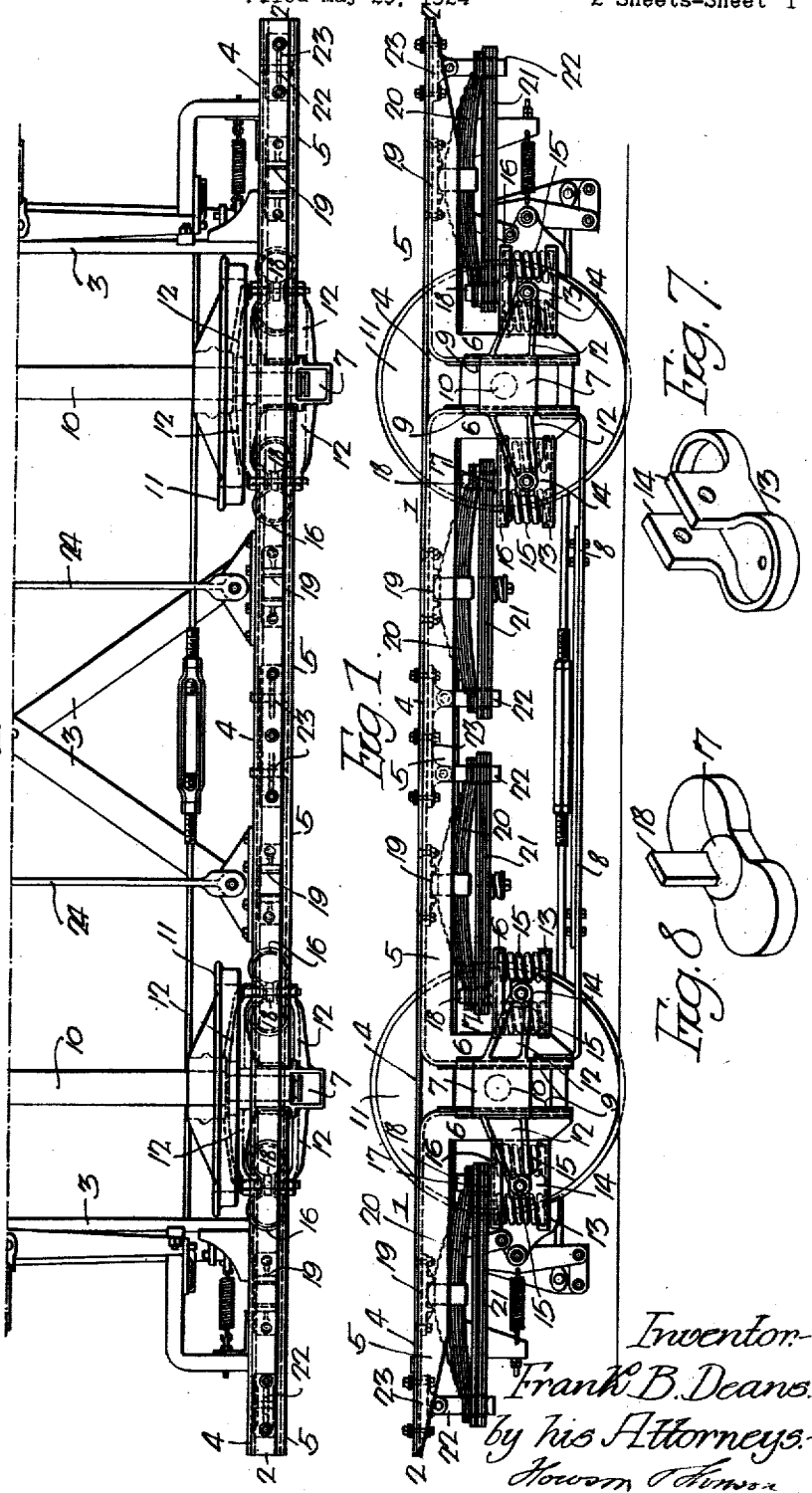

July 14, 1925. 1,546,210
F. B. DEANS
TRUCK
Filed May 29, 1924 2 Sheets-Sheet 2
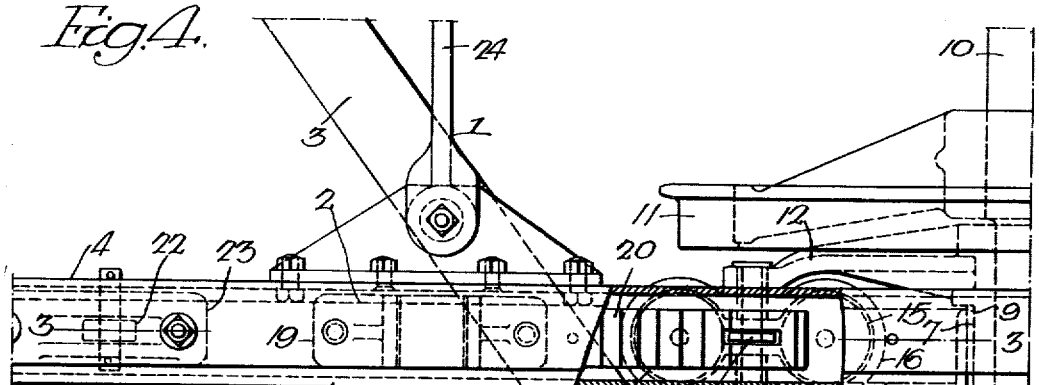
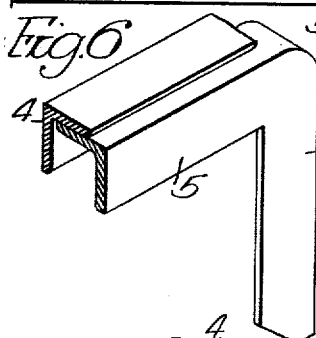
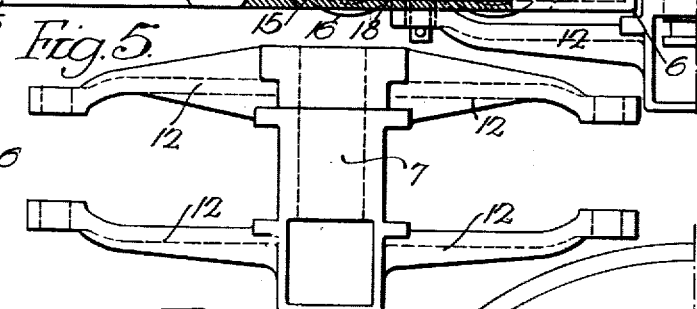
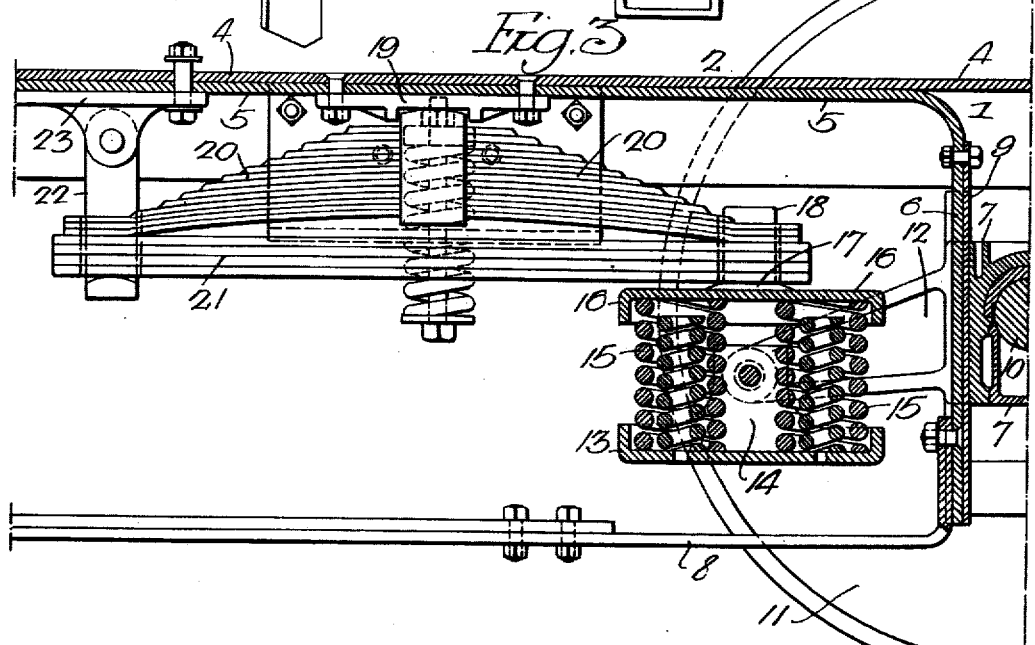
Inventor, Frank B. Deans.
by his Attorneys.

Patented July 14, 1925.

1,546,210

UNITED STATES PATENT OFFICE.

FRANK B. DEANS, OF SHARON HILL, PENNSYLVANIA, ASSIGNOR TO THE BALDWIN LOCOMOTIVE WORKS, OF PHILADELPHIA, PENNSYLVANIA, A CORPORATION OF PENNSYLVANIA.

TRUCK.

Application filed May 29, 1924. Serial No. 716,611.

*To all whom it may concern:*

Be it known that I, FRANK B. DEANS, a citizen of the United States, residing in Sharon Hill, Delaware County, Pennsylvania, have invented certain Improvements in Trucks, of which the following is a specification.

My invention relates to certain improvements in four-wheel trucks for electrically driven cars, the car body resting directly upon the frame of the truck.

One object of my invention is to design the spring rigging of the truck so that the truck will ride easily under all conditions. A further object of the invention is to construct the spring in two sections, one section sustaining a light load and the two sections combined sustaining heavy loads. The invention also relates to certain details of construction which will be described hereinafter.

In the accompanying drawings:

Fig. 1 is a side view of a truck, illustrating my invention; and

Fig. 2 is a plan view of one half of the truck; and

Fig. 3 is an enlarged longitudinal sectional view on the line 3—3, Fig. 4; and

Fig. 4 is a plan view, partly in section, of a portion of the truck; and

Fig. 5 is a detached plan view of one of the boxes; and

Fig. 6 is a detached perspective view, illustrating the construction of the side members of the frame; and Figs. 7 and 8 are detached perspective views of the two coiled spring seats.

The frame 1 of the truck consists of two side members 2, connected by cross members 3. Each side member consists of a longitudinal angle beam 4, extending the full length of the truck, and a series of angle sections 5, secured to the beam 4 and bent to form the pedestals 6, for the axle boxes 7. The inner pedestals at each end of the truck are connected at their lower ends by a tie bar 8, Fig. 1.

Wear plates 9, are secured to the pedestals 6, as shown in Fig. 3.

Mounted in the boxes 7 are axles 10, on which are the wheels 11.

The axle boxes are made as shown in Fig. 3 and Fig. 4, and are provided with two pairs of arms 12, one pair at each side, on which are hung the lower spring seats 13, shaped as shown in Fig. 7. Each spring seat 13 has side extensions 14, and pins extend through the arms 12, of the boxes, and through the extensions 14. By this construction, the spring seat is free to accommodate itself to the movements of the spring mechanism.

Two coiled springs 15 are mounted on each lower spring seat 13. Supported by the springs is an upper spring plate 16, shaped as shown in Fig. 8, which is provided with a rounded bearing surface 17, from which projects a post 18.

Secured in the channel formed by the angle beam and the angle sections is a series of spring seats 19, shaped to fit the straps of the semi-elliptical spring 20.

Located under each semi-elliptical spring 20 is a flat spring 21. Each spring is slotted at each end. The post 18, on a top plate 16, extends through the slots in one end of each of the springs 20 and 21, and a link 22, pivoted to a bracket 23, extends through the slots in the opposite ends of the springs 20 and 21. These links are T-shaped at their lower ends to form supports for the springs—see Fig. 3.

By the above construction, the frame is supported on the axles by a series of spring riggings, each consisting of a pair of coiled springs, a semi-elliptical spring, and a flat spring.

Under normal, or light, loads the frame is carried by the semi-elliptical springs and the coiled springs, but, when the load becomes excessive, then the central straps of the semi-elliptical springs come in contact with the flat springs 21, and the load is then taken by both springs 20 and 21, as well as the coiled springs 15.

On referring to the drawings, it will be seen that each axle box is coupled to the frame by two sets of springs, one on each side of the pedestal for the boxes. This construction is duplicated on the opposite side of the truck.

The cross bars 24, shown in Fig. 2, are spring supported on the frame, and carry the overhanging portions of the motors.

A brake rigging is shown in Fig. 1 and

Fig. 2. This rigging forms no part of my invention, and, therefore, it will not be described.

I claim:

1. The combination in a truck, of a frame having pedestals; axle boxes mounted in the pedestals, each axle box having arms at each side; a semi-elliptical spring mounted on the frame at each side of the pedestal, one end of each of said springs being connected to the frame, and coiled springs hung from the said arms of the axle boxes and supporting the other ends of the semi-elliptical springs.

2. The combination in a truck, of a frame having a pedestal; axle boxes in the pedestal; a pair of springs at each side of the pedestal, one spring being semi-elliptical and the other spring being flat; and coiled springs located on each side of the pedestal and connected to the axle boxes and to the first mentioned springs, and arranged to support the frame on the axle boxes through the semi-elliptical and flat springs.

3. The combination in a truck, of a frame, having pedestals; axle boxes mounted in the pedestals, each box having arms at each side; spring seats hung from the arms; coiled springs on each spring seat; top seat plates resting on the springs; and a pair of springs on each side of each pedestal, one of which is semi-elliptical and the other flat, the semi-elliptical spring resting on the frame, both springs connected to the frame and resting on the top seat of the coiled springs.

FRANK B. DEANS.